US012651476B1

(12) United States Patent
Files et al.

(10) Patent No.: US 12,651,476 B1
(45) Date of Patent: Jun. 9, 2026

(54) INTELLIGENT CAPTURE PLATFORM

(71) Applicant: THE HUNTINGTON NATIONAL BANK, Columbus, OH (US)

(72) Inventors: Gregory Files, Columbus, OH (US); Veer Murukutla, Columbus, OH (US); Vijayakumar Gutti, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/186,208

(22) Filed: Apr. 22, 2025

(51) Int. Cl.
*G06V 30/42* (2022.01)
*G06V 30/19* (2022.01)
*G06V 30/416* (2022.01)

(52) U.S. Cl.
CPC ............ *G06V 30/42* (2022.01); *G06V 30/191* (2022.01); *G06V 30/416* (2022.01)

(58) Field of Classification Search
None
See application file for complete search history.

(56) References Cited

U.S. PATENT DOCUMENTS

| | | | | |
|---|---|---|---|---|
| 7,849,049 B2 * | 12/2010 | Langseth | .............. | G06F 16/254 707/602 |
| 2007/0168382 A1 * | 7/2007 | Tillberg | .............. | G06F 16/5846 707/E17.084 |
| 2010/0228721 A1 * | 9/2010 | Mok | ...................... | G06F 16/248 707/711 |
| 2018/0176409 A1 * | 6/2018 | Smith | ................ | H04N 1/00809 |
| 2024/0303412 A1 * | 9/2024 | Evans | .................. | G06V 30/416 |

* cited by examiner

*Primary Examiner* — Richard L Bowen
(74) *Attorney, Agent, or Firm* — Kilpatrick Townsend & Stockton LLP

(57) ABSTRACT

An automated process can extract field data from a digital file comprising at least one digital document associated with at least one document type based at least in part on information associated with the at least one digital document or a user input. The automated process can include determining, from a configuration file, the one or more fields associated with the document type and extracting the field data from the at least one digital document. The determination can include using the document type to identify the one or more fields associated with the document type from the configuration file. The extracted field data can be stored and accessible to client devices.

20 Claims, 9 Drawing Sheets

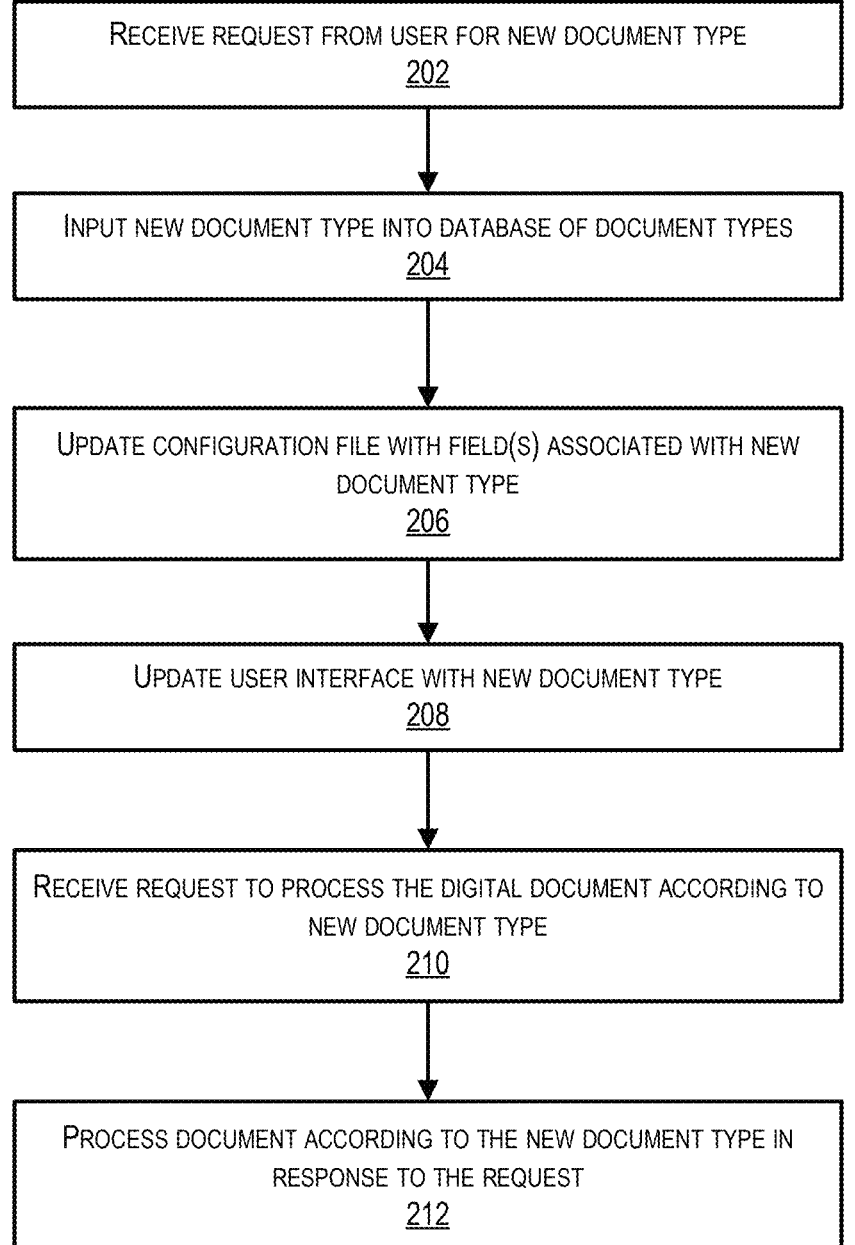

RECEIVE REQUEST FROM USER FOR NEW DOCUMENT TYPE
202

INPUT NEW DOCUMENT TYPE INTO DATABASE OF DOCUMENT TYPES
204

UPDATE CONFIGURATION FILE WITH FIELD(S) ASSOCIATED WITH NEW DOCUMENT TYPE
206

UPDATE USER INTERFACE WITH NEW DOCUMENT TYPE
208

RECEIVE REQUEST TO PROCESS THE DIGITAL DOCUMENT ACCORDING TO NEW DOCUMENT TYPE
210

PROCESS DOCUMENT ACCORDING TO THE NEW DOCUMENT TYPE IN RESPONSE TO THE REQUEST
212

200

*FIG. 2*

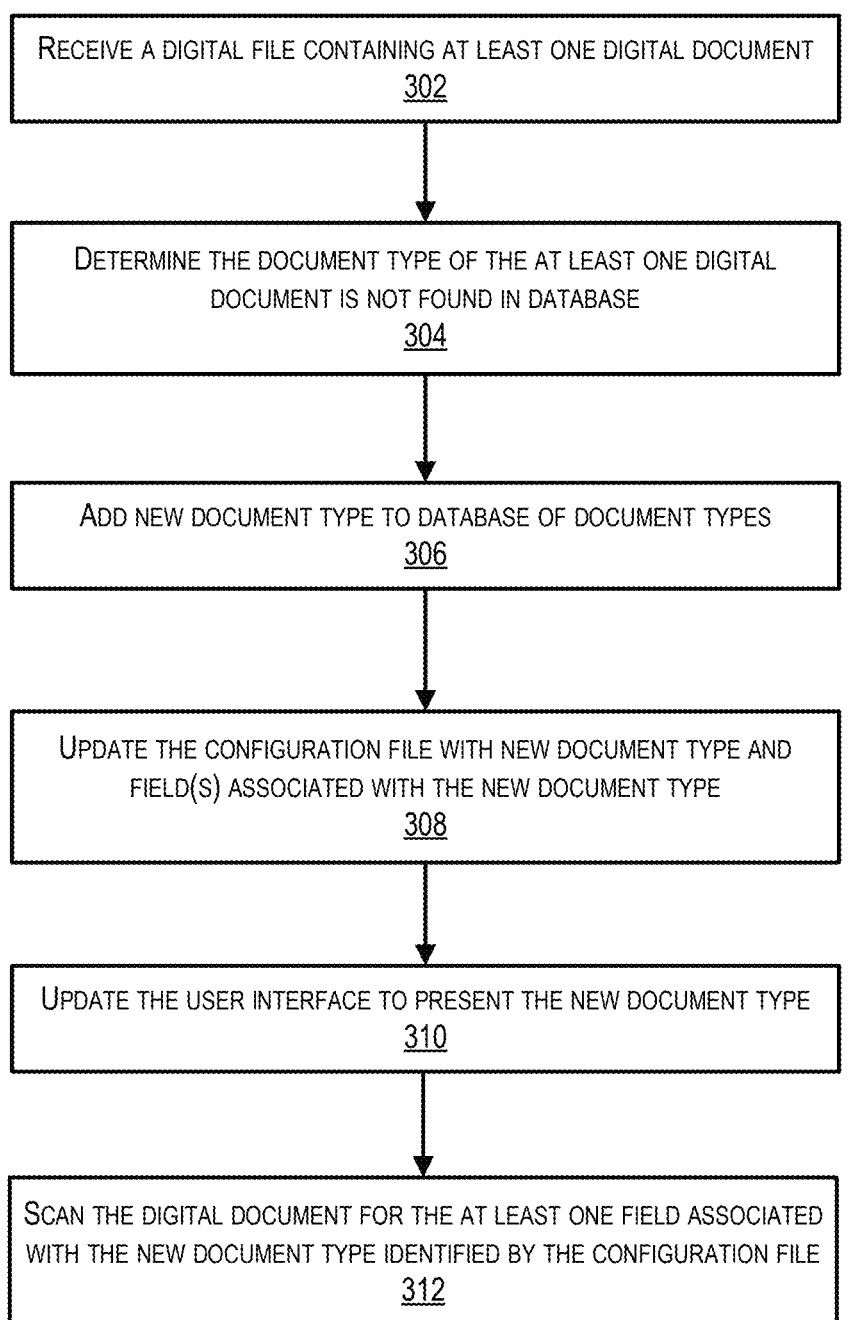

RECEIVE A DIGITAL FILE CONTAINING AT LEAST ONE DIGITAL DOCUMENT
302

DETERMINE THE DOCUMENT TYPE OF THE AT LEAST ONE DIGITAL DOCUMENT IS NOT FOUND IN DATABASE
304

ADD NEW DOCUMENT TYPE TO DATABASE OF DOCUMENT TYPES
306

UPDATE THE CONFIGURATION FILE WITH NEW DOCUMENT TYPE AND FIELD(S) ASSOCIATED WITH THE NEW DOCUMENT TYPE
308

UPDATE THE USER INTERFACE TO PRESENT THE NEW DOCUMENT TYPE
310

SCAN THE DIGITAL DOCUMENT FOR THE AT LEAST ONE FIELD ASSOCIATED WITH THE NEW DOCUMENT TYPE IDENTIFIED BY THE CONFIGURATION FILE
312

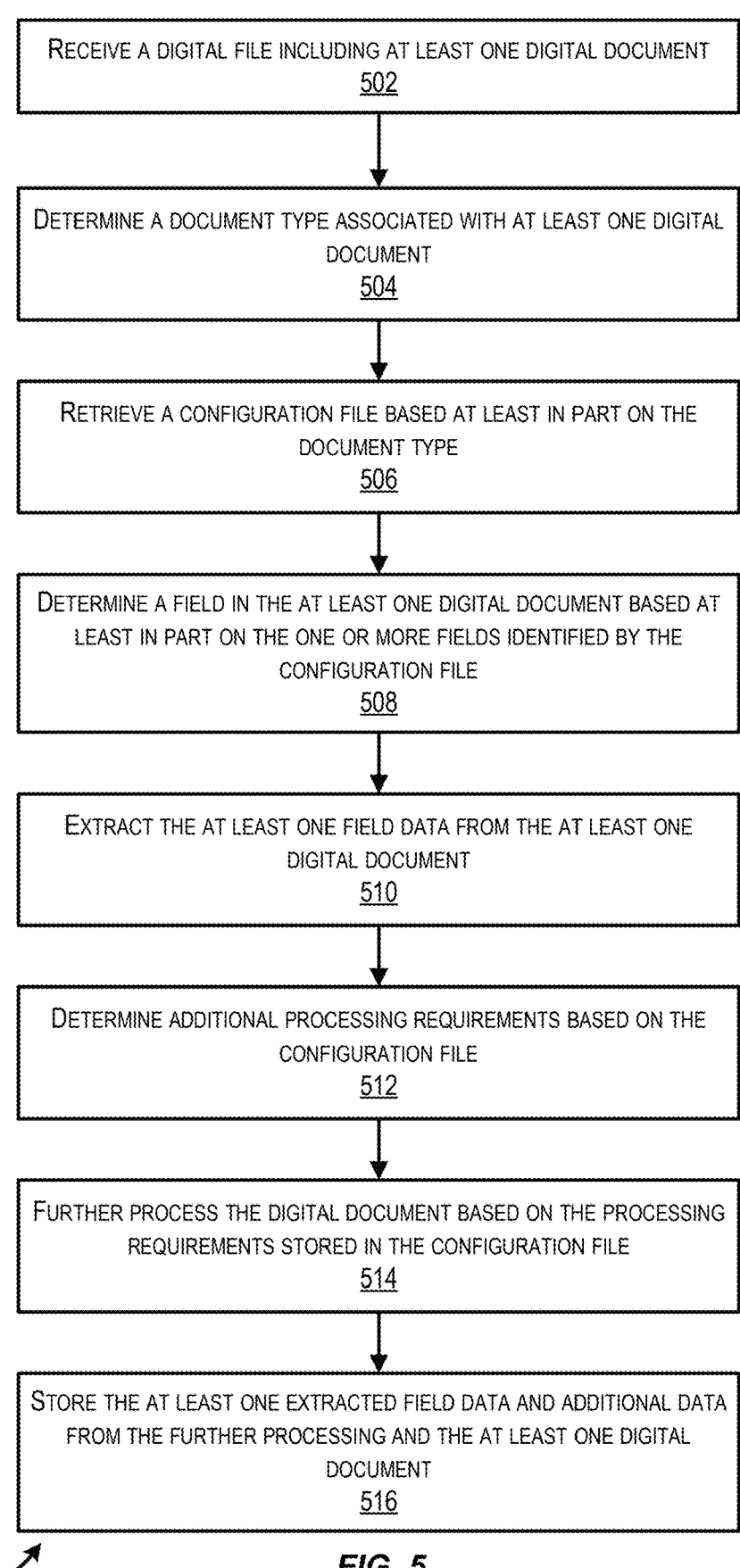

RECEIVE A DIGITAL FILE INCLUDING AT LEAST ONE DIGITAL DOCUMENT
502

DETERMINE A DOCUMENT TYPE ASSOCIATED WITH AT LEAST ONE DIGITAL DOCUMENT
504

RETRIEVE A CONFIGURATION FILE BASED AT LEAST IN PART ON THE DOCUMENT TYPE
506

DETERMINE A FIELD IN THE AT LEAST ONE DIGITAL DOCUMENT BASED AT LEAST IN PART ON THE ONE OR MORE FIELDS IDENTIFIED BY THE CONFIGURATION FILE
508

EXTRACT THE AT LEAST ONE FIELD DATA FROM THE AT LEAST ONE DIGITAL DOCUMENT
510

DETERMINE ADDITIONAL PROCESSING REQUIREMENTS BASED ON THE CONFIGURATION FILE
512

FURTHER PROCESS THE DIGITAL DOCUMENT BASED ON THE PROCESSING REQUIREMENTS STORED IN THE CONFIGURATION FILE
514

STORE THE AT LEAST ONE EXTRACTED FIELD DATA AND ADDITIONAL DATA FROM THE FURTHER PROCESSING AND THE AT LEAST ONE DIGITAL DOCUMENT
516

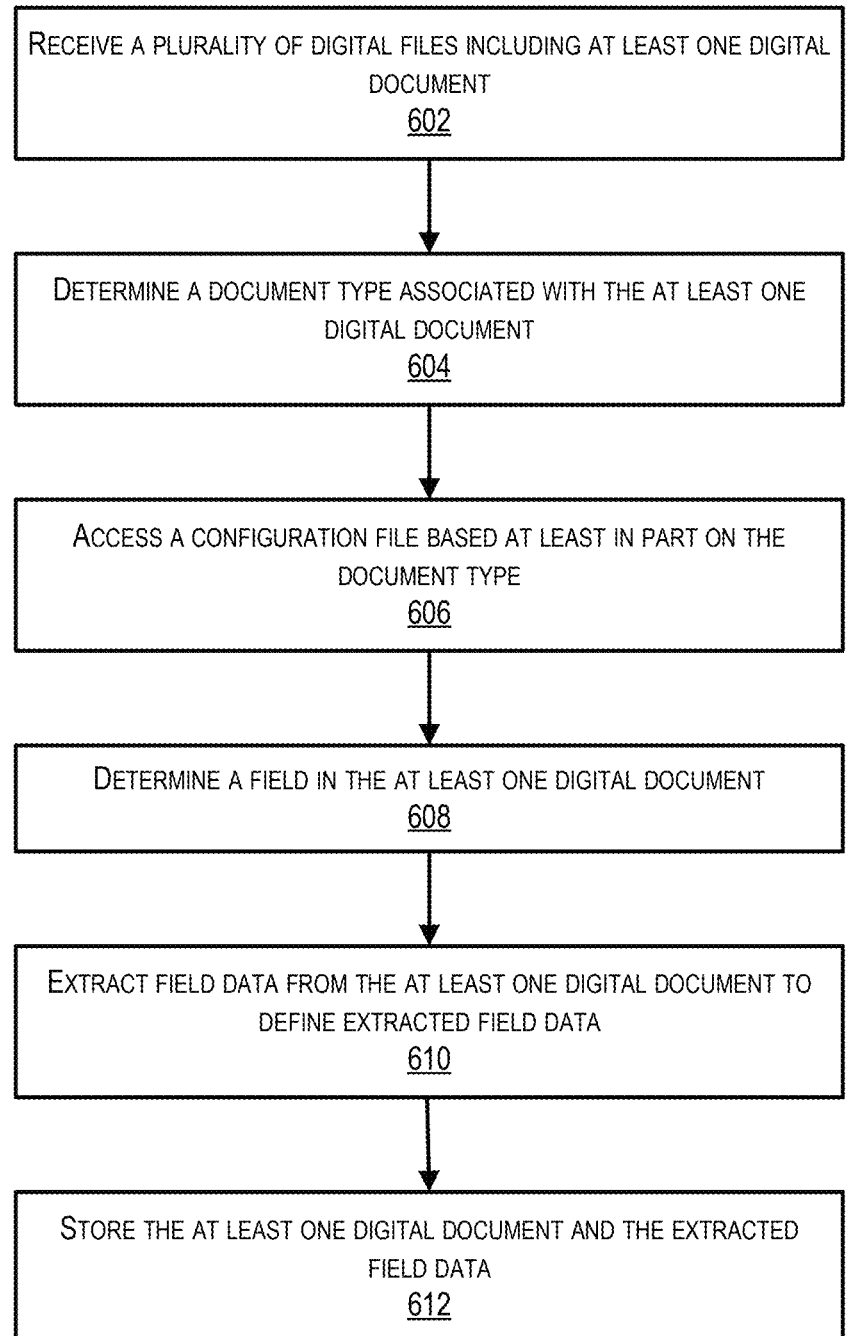

RECEIVE A PLURALITY OF DIGITAL FILES INCLUDING AT LEAST ONE DIGITAL DOCUMENT
602

DETERMINE A DOCUMENT TYPE ASSOCIATED WITH THE AT LEAST ONE DIGITAL DOCUMENT
604

ACCESS A CONFIGURATION FILE BASED AT LEAST IN PART ON THE DOCUMENT TYPE
606

DETERMINE A FIELD IN THE AT LEAST ONE DIGITAL DOCUMENT
608

EXTRACT FIELD DATA FROM THE AT LEAST ONE DIGITAL DOCUMENT TO DEFINE EXTRACTED FIELD DATA
610

STORE THE AT LEAST ONE DIGITAL DOCUMENT AND THE EXTRACTED FIELD DATA
612

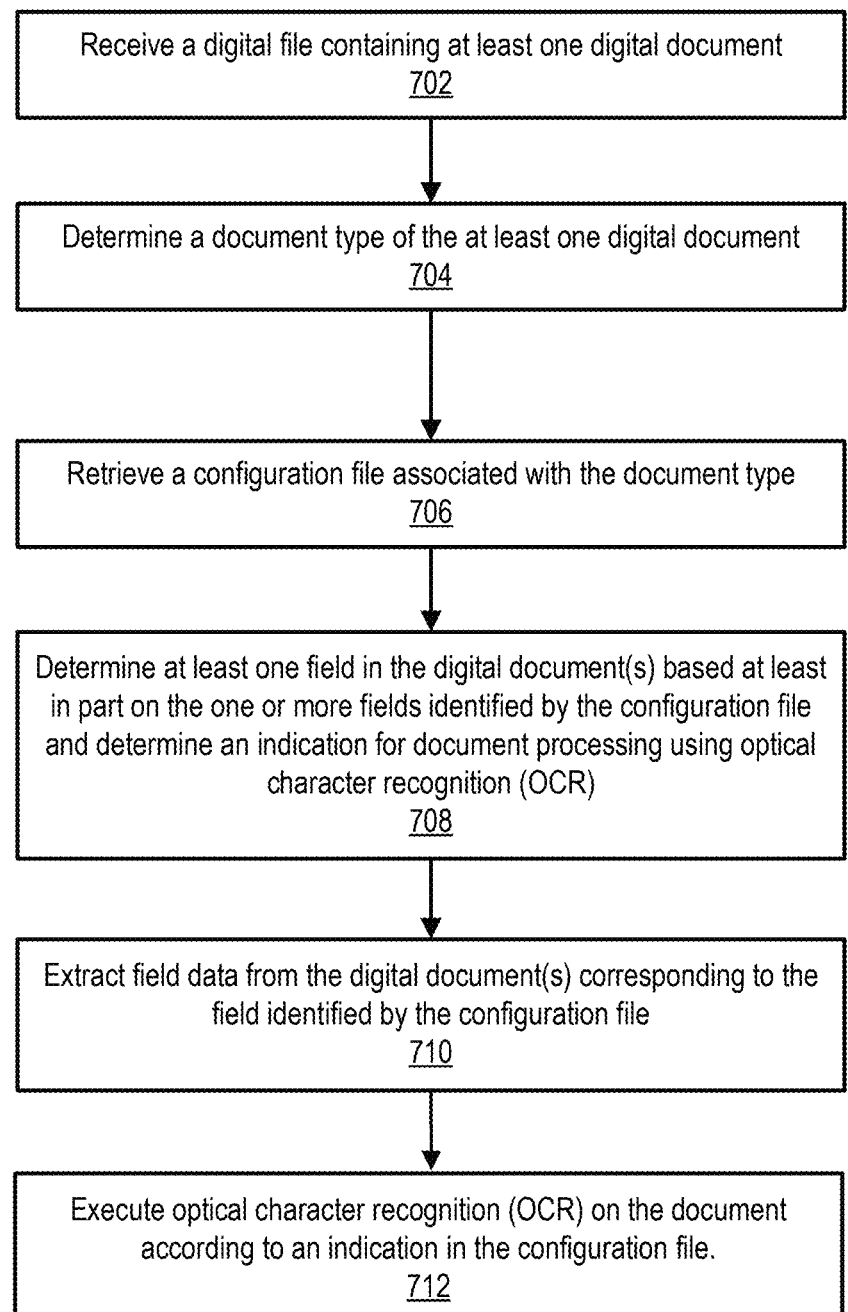

Receive a digital file containing at least one digital document
702

Determine a document type of the at least one digital document
704

Retrieve a configuration file associated with the document type
706

Determine at least one field in the digital document(s) based at least in part on the one or more fields identified by the configuration file and determine an indication for document processing using optical character recognition (OCR)
708

Extract field data from the digital document(s) corresponding to the field identified by the configuration file
710

Execute optical character recognition (OCR) on the document according to an indication in the configuration file.
712

INTELLIGENT CAPTURE PLATFORM

TECHNICAL FIELD

This disclosure is generally directed to structure data capture. Specifically, the disclosure is directed to techniques for efficiently processing structured data in a digital document according to its document type.

BACKGROUND

Sophisticated entities may utilize a great number of documents to perform their objectives. Each document may be associated with its own document type depending on the specific requirement for that document. These entities may include a large number of document types. Each document may also contain a multitude of data fields, which may vary from among document types and even with respect to other documents within the same document type.

An automatic data capture application may be used to process documents of a certain document type. However, an application which captures and processes data for one document type may be unable to capture and process data associated with another document type.

SUMMARY

Various examples are described including systems, methods, and devices relating to digital document field data capture.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method also includes receiving a plurality of digital files that may include at least one digital document. The method also includes determining a document type associated with the at least one digital document based at least in part on i) information associated with the at least one digital document, or ii) a user input. The method also includes accessing a configuration file based at least in part on the document type, where the configuration file identifies one or more fields associated with the document type. The method also includes determining a field in the at least one digital document based at least in part on the one or more fields identified by configuration file. The method also includes extracting field data from the at least one digital document to define extracted field data, where the field data corresponds to the field identified by the configuration file. The method also includes after extracting the field data from the at least one digital document, storing the at least one digital document, and storing the extracted field data.

One general aspect includes a system. The system also includes a display. The system also includes an input component. The system also includes a memory configured to store computer-executable instructions. The system also includes a processor configured to access the memory and execute the computer-executable instructions to at least: receive a plurality of digital files that includes at least one digital document. The system also determines a document type associated with the at least one digital document based at least in part on i) information associated with the at least one digital document, or ii) a user input. The system also may access a configuration file based at least in part on the document type, where the configuration file identifies one or more fields associated with the document type. The system also determines a field in the at least one digital document based at least in part on the one or more fields identified by configuration file. The system extracts field data from the at least one digital document, where the field data corresponds to the field identified by the configuration file. The system also, after extracting the field data from the at least one digital document, store the at least one digital document, and store the extracted field data.

One general aspect includes one or more non-transitory computer-readable media including computer-executable instructions that, when executed by one or more computing systems, cause the one or more computing systems to receive a plurality of digital files that may include at least one digital document. The instructions further cause the one or more computing systems to determine a document type associated with the at least one digital document based at least in part on i) information associated with the at least one digital document, or ii) a user input. The instructions further cause the one or more computing systems to access a configuration file based at least in part on the document type, where the configuration file identifies one or more fields associated with the document type. The instructions further cause the one or more computing systems to determine a field in the at least one digital document based at least in part on the one or more fields identified by configuration file. The instructions further cause the one or more computing systems to extract field data from the at least one digital document, where the field data corresponds to the field identified by the configuration file. The instructions further cause the one or more computing systems to, after extracting the field data from the at least one digital document, store the extracted field data.

BRIEF DESCRIPTION OF THE DRAWINGS

FIG. 2 is an example flowchart illustrating updating a configuration file and a user interface with a new document type, according to at least one example;

FIG. 3 is an example flowchart illustrating an example process for updating a configuration file and a user interface with a new document type, according to at least one example;

FIG. 5 is an example flowchart illustrating an example process for processing extracted field data from a digital document, according to at least one example;

FIG. 6 is an example flowchart illustrating an example process for scanning a digital document and extracting field data, according to at least one example;

FIG. 7 is an example flowchart illustrating an example for processing extracted field data according to further processing requirements, according to at least one example;

DETAILED DESCRIPTION

Figure 1:
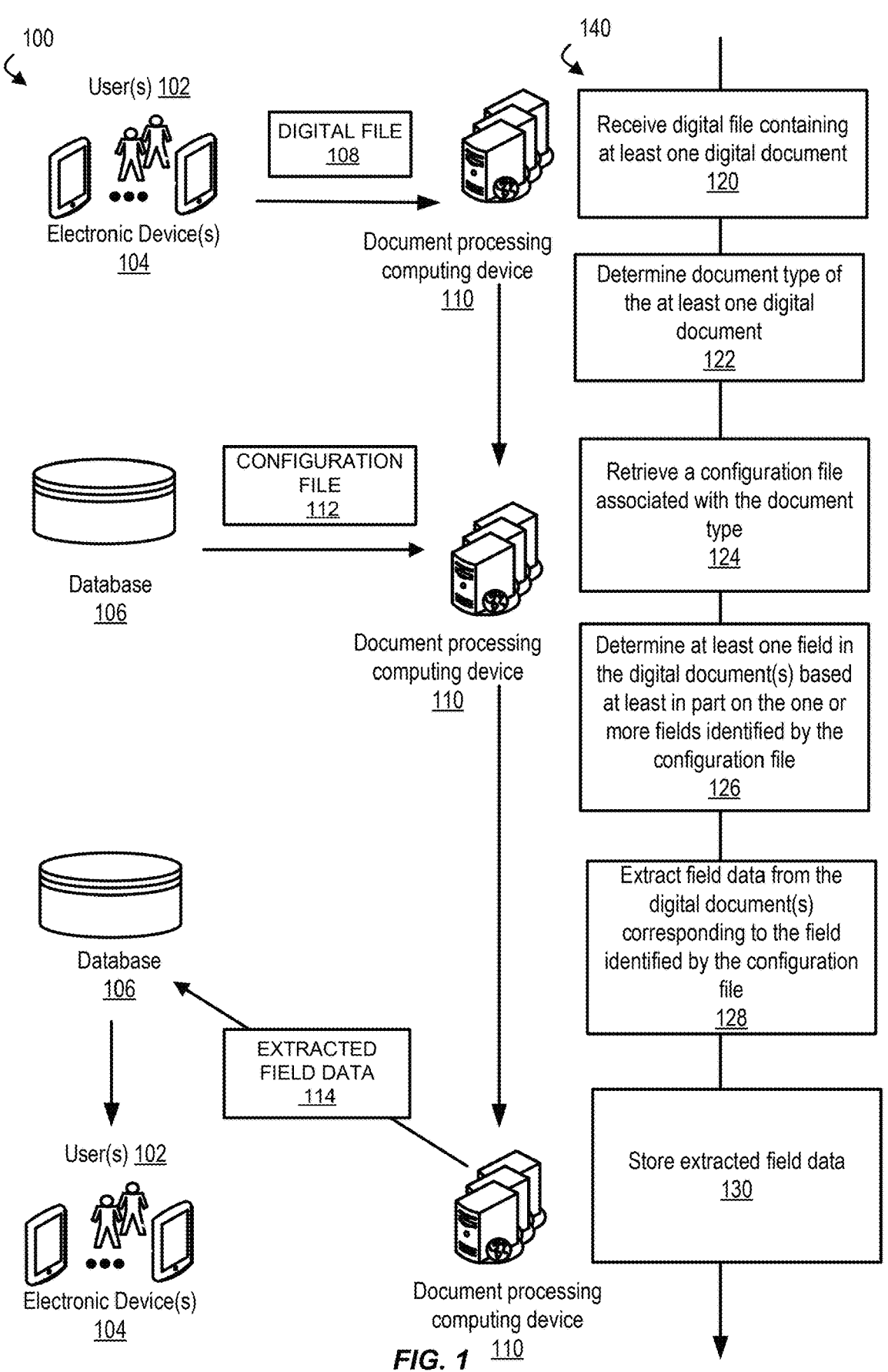
FIG. 1 is an example flow diagram illustrating dynamically processing digital files, according to at least one example.

In the following description, various embodiments will be described. For purposes of explanation, specific configurations, and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Examples described in the present disclosure relate to, among other things, methods, systems, devices, and computer-readable storage media relating to a document type neutral automated field extraction and storage platform for automating digital document field data capture. The automated field extraction and storage platform is configured to identify and process digital documents of various unique document types from various unique client devices i.e., document type neutral.

The automated field extraction and storage platform described herein can receive user provided input through a graphical user interface (GUI) at electronic device. The GUI may be dynamically updated with a graphical representation of the document type options available for user selection at the electronic device when a new document type is received by the system. The data fields associated with a particular document type may also be graphically represented (e.g., list, table, etc.) on the electronic device.

In a first particular example, an automated field extraction and storage platform includes, but is not limited to, a user input engine and a data processing engine. Additionally, the automated field extraction and storage platform is in communication with a network of servers, client devices, and databases. After the user input engine receives a batch of digital documents from a client device for processing, the data processing engine references a configuration file for the list of data fields associated with the document type for capture. Thus, rather than needing to create a new application tailored to capturing data for each unique document type, the platform is capable of processing batches of digital documents regardless of the document type associated with each digital document. In addition to managing the data fields to be extracted for each unique document type, the configuration file also manages additional processes (e.g., optical character recognition, custom actions, etc.) associated with certain document types. When the platform has completed data extraction for the current batch of digital documents, a next batch of digital documents from the same or different electronic device is received for processing.

In a second particular example that is related to the first particular example, an automated field extraction and storage platform receives a batch of digital documents for which an associated document type does not exist in the configuration file. The document type is then added to the configuration file for display at the user interface (e.g., drop-down menu, selectable radio buttons, etc.) and the associated data fields for capture is added to the database. The platform, having been updated with the new document type and associated data fields for capture, may then proceed with data field capture without requiring a re-instantiation of the platform. The new document type and the data fields associated with the new document type may be added to GUI in a number of ways. The automated field extraction and storage platform may, using a suitable event handler, detect that the new document type's data fields have been successfully added to the configuration file (e.g., keypress event, menu exit, etc.), whereupon instructions to refresh the GUI and display the new document type are executed.

In another example related to the first particular example, digital documents related to more than one document type may be processed by the platform. For example, the platform may receive a digital document and, after processing the document, determine that the document is associated with multiple document types. The platform may then proceed to capture data according to the data fields associated with the multiple detected document types. The data captured may be stored according to the document type it is associated with. Thus, first document data may be stored in connection with a first document type and second document data may be stored in connection with a second document type. In addition to or alternatively, the platform may proceed to execute additional processes (e.g., optical character recognition, custom actions, etc.) associated with certain document types, which may include processing different parts of the document differently depending on the document type.

These illustrative examples are given to introduce the reader to the general subject matter discussed herein and the disclosure is not limited to this example. The following sections describe various additional non-limiting examples techniques relating to using an automated field extraction and storage platform to extract data from digital documents.

The systems, devices, and techniques described herein provide several technical advantages that improve data capture of digital documents. Traditional methods of data capture include utilizing commercially available data capture applications with pre-programmed native features and/or functionality. While some modification and customization options exist within commercially available data capture applications, it is impractical to modify and customize the application to handle new document types when the need arises. Likewise, commercially available data capture applications may only support one document type per data capture session and thus require a new session be instantiated whenever a new or different document type received for processing. Because the automated field extraction and storage platform can process different document types without needing to be re-instantiated, the system conserves computing resources and is more efficient. In particular, because the platform utilizes a configuration file (or other suitable means) to store document type specific values and attributes, thereby reducing the need for document type specific hardcoded values, the code complexity decreases and computing speed increases as a consequence. Using a configuration file also reduces the need to modify the source code, which mitigates introducing a programming error into the source code. In addition, because the platform is document type neutral, less memory (hard drive, SSD, etc.) needs to be allocated to supporting document type specific application instructions.

Furthermore, commercially available data capture applications may not support capturing data for digital documents associated with more than one document type or may require multiple data capture applications running simultaneously (i.e., multitasking) to process a digital document associated with more than one document type. Another technical advantage provided by the techniques described herein includes providing a quicker and more efficient process for processing digital documents associated with more than one document type. Unlike conventional methods, which may require the digital document associated with more than one document type to be manually processed by a human user or to undergo additional processing, the techniques described herein may quickly and efficiently retrieve what data fields are associated with the identified document types and process the digital document according to all the data fields identified without requiring the digital document be manually processed. This eliminates the need for an operating system (OS) to multitask and execute multiple data capture applications simultaneously when processing a digital document associated with more than one document type. It is well-known that multitasking may cause longer loading times and slower overall performance given each additional application running simultaneously is then allocated a smaller fraction of overall computing resources (e.g., CPU processing time, RAM size, etc.).

When a new document type is created, associated data fields and/or rulesets are created to define the data to be captured and other processes the data is to undergo. Unlike conventional approaches that require a new computer application be developed each time a new document type is created, the techniques described herein conserves computer memory (e.g., RAM, primary memory, secondary memory, etc.) because all document types are handled through a single, streamlined application.

In addition, managing multiple data capture applications at scale poses significant logistical challenges that necessarily consumes both storage and computing resources. For example, wherein the same update applies to multiple data capture applications, the computer must dedicate resources to execute each instance of the update. In a similar vein, integration of a single data type neutral application with various other applications (APIs, databases, third-party applications, etc.) is less burdensome in comparison to having to individually integrate various document type specific applications to other applications when required.

The security and integrity of the overall system is improved because, rather than having to monitor for security vulnerabilities of multiple applications, an operator only needs to manage a single application. This is of particular importance for the techniques described herein given the data captured may be sensitive and/or confidential in nature. Data security management processes are necessarily simpler if the number of applications that capture data is kept to a minimum.

Turning now to the figures, FIG. 1 is a block diagram of an automated field extraction and storage platform 100 for automating digital document field data capture and a flowchart showing an example process 140 for processing digital documents, according to an embodiment. As discussed herein, a "document type" refers to a category to which a particular digital document belongs. Each document type is associated with a unique set of data fields. A digital document may include zero, one, or more document types. As discussed herein, "data field" or "field" refers to an area within the digital document containing capturable data. A document type may be associated with zero, one or more data fields. The data within a data field or field may come in various formats (e.g., text, numbers symbols, barcodes, etc.). The automated field extraction and storage platform 100 can include devices, databases, files and the like that are used to implement aspects of the process 140. The process 140 can be performed by the document processing computing device 110. In other embodiments, the process 140 can be performed by the document processing computing device 110 in conjunction with any combination of electronic devices 104, databases 106, digital files 108, and/or configuration files 112 (e.g., JSON, XML, etc.).

The process 140 may begin at block 120 by the document processing computing device 110 receiving a digital file 108 from an electronic device 104. An electronic device may be any suitable device from which a digital file 108 may be transmitted or received (e.g., tablet, laptop, smartphone, desktop computer, etc.). In some embodiments, the digital file 108 may include more than one file and may be received from more than one electronic device 104. The digital file 108 may be sent to the document processing device 110 upon a user 102 using the electronic device 104 to send the digital file 108. For example, the user 102 may upload the digital file 108 onto the electronic device 104 from a repository (not depicted) and send the digital file 108 to the document processing computing device 110. Each digital file 108 may contain at least one digital document.

At block 122, the document processing computing device 110 determines the document type associated with the digital document contained within the digital file 108. The document processing computing device 110 may determine the document type associated with the digital document using metadata associated with the digital file 108. For example, the metadata may be extracted from the digital document and/or received separately from the electronic device 104. In other embodiments, the document processing computing device 110 may determine the document type from input received at the electronic device 104 and input by the user 102. For example, the user 102 may select a document type from a graphical user interface (not depicted) shown on the electronic device 104. The graphical user interface may present a drop-down menu for the user 102 to select from a list of document types. In yet another embodiment, the document processing computing device 110 may determine the document type from the digital document itself. For example, depending on the file format of the digital document (e.g., PDF, JPG, DOCX, CSV, email, XLSX, etc.), the document processing computing device 110 may determine what document type is associated with the digital document. A digital document determined to be a scanned image of a physical document may indicate a certain document type. Additionally, other aspects of the digital document such as document size (e.g., letter, A4, legal, etc.), structured/non-structured, etc. may indicate the digital documents are of a certain document type.

At block 124, the document processing computing device 110 accesses a configuration file 112. The configuration file 112 may be accessed from a database 106. Database 106 may take the form of a relational database (e.g., SQL), non-relational (e.g., NoSQL), hierarchical database, etc. or any other suitable database format. The database 106 may be a centralized database and may be stored on the server, cloud (e.g., AWS, IBM Cloud, Microsoft Azure, etc.), or any other suitable method. Additionally, the database 106 may store the digital documents for processing and the data extracted from digital documents after it has been processed. The database 106 may be organized in various methods as deemed suitable such as by relationships between lines of businesses, document types, data fields, user IDs, etc. In some embodiments, the configuration file may be stored in database 106 and accessed directly from the document processing computing device 110. In some embodiments, the configuration file may be received from the electronic device 104. The document processing computing device 110 parses the configuration file 112 to identify the document type(s) within the configuration file 112. For example, if the document type identified at block 122 is a mortgage loan contract, the document processing computing device will search for mortgage loan contract within the configuration file 112.

At block 126, the document processing computing device 110 determines the at least one field associated with the identified document type within the configuration file 112. For example, for a document type mortgage loan contract, the configuration file 112 may return several fields such as lender name, loan amount, borrower name, etc. In some embodiments, where more than one document type is identified, the document processing computing device 110 may repeat the step at block 126 as many times as necessary to determine the fields associated with all identified document types.

At block 128, document processing computing device 110 extracts, based on the fields identified from block 126, all the field data for each digital document to generate the extracted field data 114. The document processing computing device 110 captures the data by, in some embodiments, identifying the area on the digital document that has been defined from the configuration file 112 to contain the field data. For example, document type mortgage loan may always list the customer's name in the top right-hand corner. Therefore, if a field associated with document type mortgage loan is "customer name", then the configuration file 112 may also store information the customer name field. The field's location may be stored as pixel coordinates in the configuration file 112. Once the document processing computing device 110 identifies the area containing the field data using the field's pixel coordinates or other suitable means, the document processing computing device 110 may recognize and extract the data from the area using an extraction tool (e.g., Optical Character Recognition (OCR), Intelligent Character Recognition (ICR), machine learning text extraction, etc.).

At block 130, the extracted field data 114 is transmitted by the document processing computing device 110 to database 106 for storage. The user 102 may retrieve, using the electronic device 104, the extracted field data 114 from the database 106. In some embodiments, the extracted field data 114 may be transmitted directly to the electronic device 104 or some other suitable repository after extraction. In other embodiments, the extracted field data 114 may be transmitted for further processing as depicted in 514 and as described below. As an example, the extracted field data may be further processed to detect and flag, among other things, potential errors in the data. Furthering processing may also entail presenting recommendations for correction for any detected potential errors in the data. Other processing such as removing duplicates, formatting data for consistency, formulating tables/graphs from the extracted data, etc. may be available after the data has been extracted.

FIG. 2 is an example flowchart illustrating a process 200 for receiving and processing a new document type. A digital document may be associated with a new document type that must be added to the platform 100 before the digital document may continue to be processed by the platform 100. In some examples, the process 200 may be performed by the document processing computing device 110. At block 202, the platform 100 receives a request from electronic device 104 for a new document type to be added to the configuration file 112. In some embodiments, the platform 100 may also receive the request for a new document type to be added from a request received from the user interface 104. The configuration file 112 stores the new document type's attributes and associated data fields and, in some embodiments, may store rules regarding additional processing rules for the new document type. For example, the configuration file 112 may store attributes of the new document type that indicate what line of business may invoke the new document type as a document type when processing digital documents. Therefore, if a digital document received for processing is determined to be from the mortgage line of business and if the new document type applies only to digital documents received from the personal loan line of business, then the platform 100 may not present the new document type to the graphical user interface 402.

At block 204, the process 200 includes storing information associated with the new document type in a database accessible to the platform 100. In some examples, this may include storing the document type in connection with other previously-defined document types and making the document type accessible for document processing techniques described herein. The database may be a database stored separately from the system and data transmitted between database and the system is communicated over a network. For example, the database may be implemented as a cloud database and the system may access contents of the cloud database by sending a request over a network.

At block 206, the process 200 includes accessing configuration file 112 and updating the configuration file 112 with the new document type. For example, updating the configuration file 112 includes adding the new document type to the configuration file 112 as well as defining the new document type's attributes within the configuration file 112. This may be accomplished using a key-value relationship with the key defined as the document type and the value defined as the document type's attributes. Other configuration file formats which allow a parent-child relationship between the document type and its attributes are also suitable (e.g., JSON, YAML, etc.). The configuration file 112 may specify the hierarchy of data fields associated with the new document type. Therefore, in a parent-child type configuration file, the attributes associated with a document type may be listed in descending or ascending order of importance. In addition, the configuration file 112 may be updated to specify certain rulesets for the new document type. The added new document type to the configuration file 112 is then associated with data fields by specifying the data fields as attributes and/or elements of the new document type.

At block 208, the process 200 includes updating the graphical user interface 402 to include an option for selecting the new document type in a document type menu 406. The graphical user interface 402 may present a document type menu 406 in the form of a drop-down menu that the user 102 may select from. The new document type may be sorted amongst the list of document types in various ways such as by alphabetical order. In some embodiments, the graphical user interface 402 may provide filters to sort document types by attributes and/or metadata determined from the configuration file 112 and/or database 106. For example, the drop-down menu may provide filters for sorting document types by most recently added or other document type attribute (e.g., line of business) determined from the configuration file 112 and/or database 106.

At block 210, the process 200 includes receiving a request from the electronic device 104 to process a digital document according to the new document type. The request may be in the form of a key press, text input, GUI button press, etc. The process 200 may determine a request received from the electronic device 104 is valid using various methods. For example, the process 200 may validate a user request by processing (in the case a GUI button press) the received button press according to validation logic. The process 200 may determine the request is from an electronic device 104 authorized to make the request by determining the permission settings of the electronic device 104. In some embodiments, the process 200 may present, at the graphical user interface 402, a dialog box or other suitable means of notifying the user 102 of successful receipt of the request to process the digital document.

At block 212, the process 200 includes processing the digital document according to the new document type in response to the request. The digital document is processed according to the new document type's information retrieved from the configuration file 112 as described herein. In some embodiments, the process 200 may receive and handle conflicting document types. For example, process 200 may a request to process the digital document according to the new document type. However, the document processing computing device 110 may identify, from the digital document, a document type different from the new document type indicated by the request. The process 200 may use various suitable methods of handling conflicting document types such as, but not limited to, presenting at the graphical user interface 402 an option to select which document type to proceed with. In other embodiments, the process 200 may proceed with processing the digital document according to both document types and storing the respective extracted data separately.

FIG. 3 is an example flowchart illustrating a process 300 of receiving a new request to process a digital file and, after determining the digital file contains at least one digital document is associated with a new document, updating the platform with the new document type. For example, a digital file may contain digital documents of various document types, of which there may be at least one new document type. For example, the digital file may contain digital document types that are associated with known document types such as new customer form, personal loan contract as well as a new document type such as credit card application. While the digital documents are being processed, the platform 100 may be updated with the new document type once a digital document associated with a new document type is encountered in process 300. For example, the platform 100 may process the digital documents associated with known document types according to the embodiments here. Once the platform 100 identifies a digital document is associated with a new document type, the platform 100 may add the new document type to the database 106 and update the configuration file 112 accordingly. The platform 100 may identify a new document type has been received by determining the new document type is not listed in the database 106 and/or the configuration file 112 does not contain a reference to the new document type.

At block 302, the process 300 includes receiving a digital file containing at least one digital document. The digital file may contain at least one digital document associated with a new document type. The digital file may be received from an electronic device as described herein. The digital file may contain metadata received from and/or separately from the electronic device. The metadata may specify the document types associated with the digital documents contained within the digital file. The metadata may also specify which configuration file to access when processing the digital documents. In addition, the metadata may, in some embodiments, indicate a new document type is associated with one or more digital documents in the digital file. For example, the metadata may be structural metadata indicating the organization and hierarchy of the data fields associated with the new document type. The platform 100 may determine, from the structural metadata received, that a new document type exists within the digital file and update the database and configuration file according to the embodiments herein.

In some embodiments, user input may indicate a new document type is associated with at least one digital document in the digital file. For example, the digital files transmitted to platform 100 for processing may be transmitted along with user input indicating a new document type is associated with at least one digital document in the digital file.

At block 304, the process 300 includes determining the document type of the at least one digital document is not found in the database. The database may contain the configuration file 112 used to store the data fields and/or rulesets associated with each document type. The database may also contain a searchable index of document types stored as a relational database that may be accessed by the platform 100 in determining if the document types associated with the digital documents are already defined. Identifying if a digital document is associated with a new document type may involve determining, by parsing the configuration file, the digital document's associated document type does not exist within the configuration file. In other embodiments, the determination that a digital document's associated document type is a new document type may be determined by receiving user input indicating the digital file contains a new document type.

At block 306, the process 300 includes adding a new document type to the database of document types. An operator may manually enter the new document type to the database and update the database with the new document type. In addition to or alternatively, the operator may update the configuration file 112 within the database with the new document type and define the data fields and/or rulesets associated with the new document type. In some embodiments, the list of document types is stored within the configuration file 112 along with the attributes and/or rulesets specific to each document type.

At block 308, the process 300 includes updating the user interface to present the new document type. Once the new document type is added to the configuration file 112, the new document type's associated data fields must be input to the platform 100 as well. The platform 100 may receive, from the electronic device 104, a list of data fields to be associated with the new document type. The electronic device 104 may present to the user 102 a list of data fields to select from to create the list of associated data fields. In other embodiments, an application administrator or operator responsible for updating and maintaining the platform 100 may update the configuration file with the data fields associated with the new document type. The fields associated with the new document type may also be added to the configuration file through an update file executed to update the system.

At block 310, the process 300 includes updating the user interface to present the new document type. The new document type identified in process 300 is presented to the user 102 at the electronic device 104 through the graphical user interface 402, which is discussed in further detail below.

At block 312, the process 300 includes scanning the digital document for the at least one field associated with the new document type identified by the configuration file. The digital document received at block 302 and identified to be associated with a new document type is processed according to the new document type. The new document type is associated with at least one field identified by the configuration file 112. The digital document is then processed according to the document processing techniques described herein.

Figure 4:
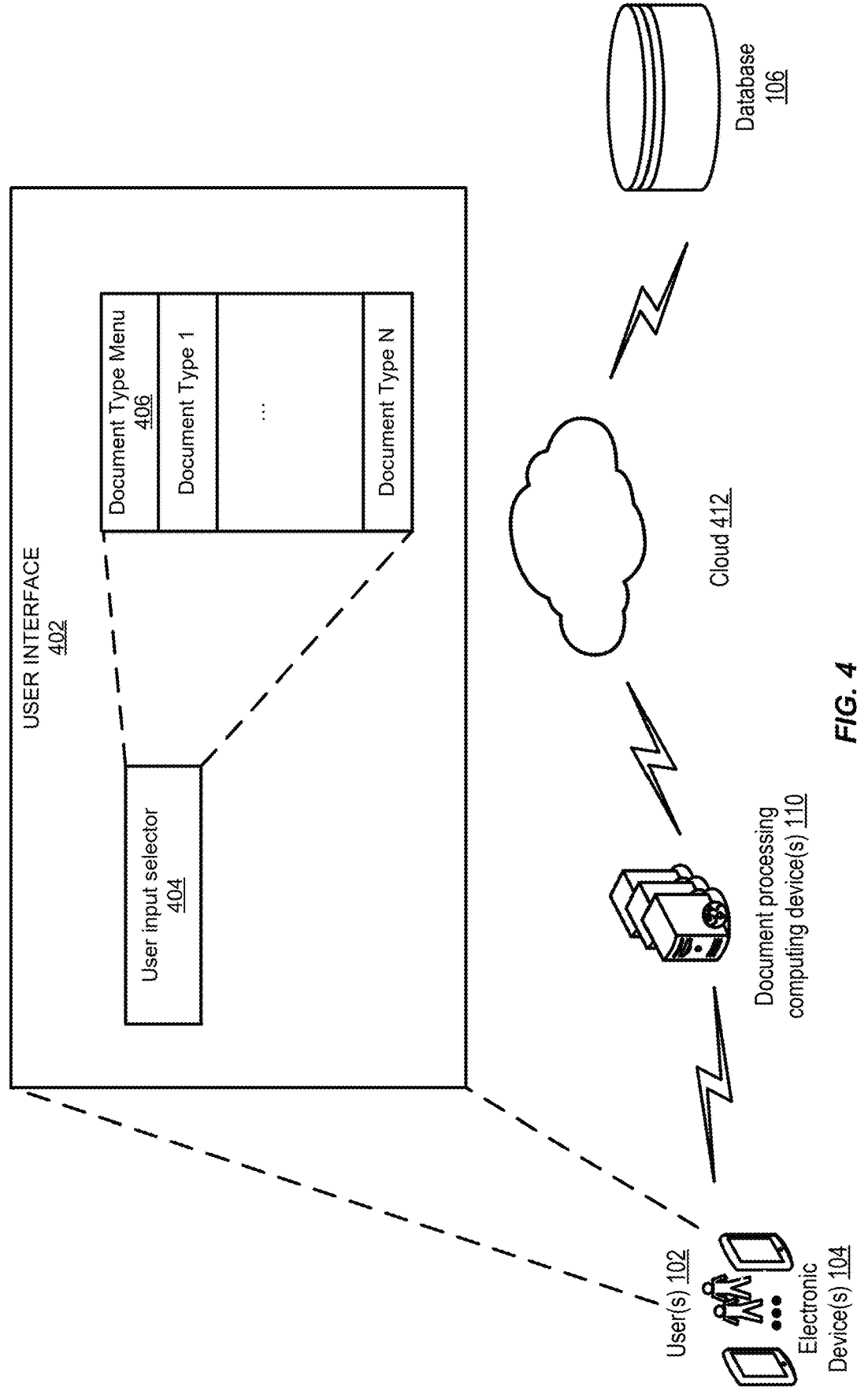
FIG. 4 is an example diagram of a user interface on a client device displaying a user input selector, according to at least one example.

FIG. 4 is an example diagram of graphical user interface 402 on an electronic display 104 displaying a user input selector 404. The graphical user interface 402 receives and transmits user input to the platform 100 to further process the digital documents according to the received user input. The platform 100 may receive, from the user interface 400, a selected document type in order to extract data from the digital documents according to the selected document type. The document types may be presented for display at the graphical user interface 402 through an electronic device 104 or any other suitable device. The graphical user interface 402 displays information by parsing the database, file, or any other suitable medium storing data the graphical user interface 402 may present at the electronic device 104. Additionally, the graphical user interface 402 may display a user input selector 404 that may present the document types in a drop-down document type menu 406. It should be noted that the user input selector 404 may use any suitable methods for displaying the document types and is not limited to using a drop-down menu (e.g., selectable radio buttons, table, etc.). Here, the document types are listed from Document Type 1 to Document Type N as a means of illustrating a list of document types for this current example. For example, the list of document types may not readily fit within view of the drop-down document type menu 406 and the user 102 may have to scroll down to see additional document types listed.

The graphical user interface 402 receives the selected document type and transmits a request for data, using the document processing computing device 110, to the cloud network 412. For example, user input received may indicate a document type selection for a "mortgage loan contract" from the document type menu 406. The document processing computing device 110 transmits a request for the configuration file 112 corresponding to the requested document type "mortgage loan contract" stored in database 106 from the cloud network 412. The cloud network 412 then processes the request for configuration file 112 corresponding to the specified document type and retrieves the corresponding configuration file 112 stored in database 106 by using the document type name as an ID. The document processing computing device 110 then receives the corresponding configuration file 112 and the document processing computing device 110 then parses the configuration file 112 for the identified document type "mortgage loan contract" and its associated data fields be used during automated data capture as described in process 140. For example, the configuration file may use key-value pairs to store the document type as the key and its associated data fields, attributes, and/or rulesets as the values. The document processing computing device 110 uses the document type received via user input as the key when parsing the configuration file for the document type's corresponding values i.e., the document type's attributes and/or rulesets. The document processing computing device 110, based on the document type's attributes and/or rulesets, extracts the field data according to the embodiments disclosed herein.

FIG. 5 is a flowchart illustrating process 500 for handling further processing requirements for digital documents after field data has been extracted as described in process 140. The configuration file 112 may specify further processing requirements for a particular document type. Further processing requirements, in some embodiments, may include identifying errors, inconsistencies, formatting issues, etc. in the extracted data. For example, if a particular document type's ruleset states all numbers should be represented by numerals, then further processing may include detecting spelled-out numbers and converting them into numerals. Document types that may require duplicate data be removed may then transmit the extracted data to, in some embodiments, a data validation engine that may flag and/or remove duplicate data.

At block 502, the process 500 includes receiving a digital file including at least one digital document. Block 502 may be an example of block 120 in process 140 described herein.

At block 504, the process 500 includes determining a document type associated with at least one digital document. Block 504 may be an example of block 122 in process 140 described herein.

At block 506, the process 500 includes retrieving a configuration file based at least in part on the document type. Block 506 may be an example of block 124 in process 140 described herein.

At block 508, the process 500 includes determining a field in the at least one digital document based at least in part on the one or more fields identified by the configuration file. Block 508 may be an example of block 126 in process 140 described herein.

At block 510, the process 500 includes extracting the at least one field data from the at least one digital document. Block 510 may be an example of block 128 in process 140 described herein.

At block 512, process 500 includes determining additional processing requirements based on the configuration file. The platform 100 identifies which digital documents require further processing by, based on its document type, accessing configuration file 112 to determine what, if any, additional requirements are necessitated for that document type. For example, the configuration file 112 may list the document types and its associated fields, attributes, and/or processing requirements/rulesets as key-value pairs. After the document processing computing device 110 completes extraction of field data, the document processing computing device 100 may access the configuration file 112 and, using the document type as the key, identify any processing requirements and/or rulesets associated with the document type.

At block 514, process 500 includes further processing the digital document based on the processing requirements stored in the configuration file. The document processing computing device 110, having identified further processing requirements and/or rulesets associated with the digital document's document type, may then transmit the extracted data to the suitable processing engine. For example, the document type may require the extracted data be further processed to validate the extracted data against business rules. The document processing computing device 110 may then store the extracted data in the database 106 with a flag indicating the extracted data be transmitted to a data validation engine. Additional processing (OCR, ICR, data validation, etc.) need not be executed by the platform 100 but may, according to some embodiments, transmit the digital document and/or its extracted data to the suitable computing device for further processing. In some embodiments, the client device 104 may execute the further processing once the digital file and/or its extracted data is received by the client device 104.

At block 516, process 500 includes storing the at least one extracted field data and additional data from the further processing and the at least one digital document. The document processing computing device 110 may store the extracted field data and/or the digital document in database 106. In other embodiments, the extracted field data and/or digital document may be stored in a separate, centralized database to facilitate accessibility to the extracted field data and/or digital document. For example, a centralized database hosted in a cloud network may allow client devices to access the extracted field data and/or digital documents. The centralized database may include permission and authorization logic to prevent extracted field data and/or digital documents from being accessed by unauthorized client devices. The extracted data and/or digital documents that require further processing may be accessed by a suitable client device that handles the further processing.

FIG. 6 is a flowchart illustrating an example process 600 for scanning a digital document and extracting field data, according to at least one example. The process 600 may be performed by document processing computing device 110 as part of the platform 100. As described above, a digital file may contain digital documents that may require data extraction. The digital file may be associated with a class of digital files and the document type may define a sub-class within the class. For example, the digital file may be a class defined as "loan documents" and within the loan document type class, there may be sub-classes of document types such as "mortgage loan documents", "personal loan document", "automobile loan document", etc. Automated extraction is performed on the digital documents contained in the digital files. In some embodiments, a sub-class of document types may belong to more than one class of digital files.

At block 602, the process 600 includes receiving a plurality of digital files including at least one digital document. The digital file may contain one or more digital files. The digital files may all be associated with one document type or associated with different document types. The digital file may be transmitted from a line of business to the document processing computing device 110. In addition to or alternatively, the digital files may be transmitted from electronic device(s) 104 to the document processing computing device 110. The electronic device 104 may provide a user interface from which user input indicating the document type is inputted and transmitted along with the digital files for processing.

In some embodiments, the plurality of digital files may be associated with a particular operational unit and the process 600 may include sending a communication to the particular operational unit that includes information for accessing the at least one digital document and the extracted field data. In some embodiments, the information for accessing the at least one digital document may comprise one or more uniform resource locators.

In some embodiments, the process 600 may include receiving information identifying a new document type, the information based at least in part on an additional user input. In this embodiment, the process 600 may update a list of possible document types to include the new document type and update, based at least in part on the new document type, the configuration file with one or more fields associated with the new document type.

In some embodiments, the process 600 may include providing a user interface for presentation. The user interface may present a plurality of document types in a menu and determining the document type based at least in part on the user input may comprise receiving a user selection of the document type via the menu. In some embodiments, the user interface may be updated to include the new document type and new field data associated with the new document type and updating the user interface is performed without recompiling software code.

In some embodiments, the process 600 may include receiving, from an electronic device, a request to access at least one of the digital document or the extracted field data and providing at least one of the digital document or the extracted field data for presentation at the electronic device.

In some embodiments, the process 600 may include providing a user interface for presentation, the user interface presents a plurality of field data in a panel, and wherein the field data is presented is based at least in part on the document type.

At block 604, the process 600 includes determining a document type associated with the at least one digital document. The document type may be determined, in some embodiments, based on information associated with the at least one digital document. For example, the digital document may contain metadata identifying the document type associated with the digital document. Metadata indicating size, format, line of business, etc. of the digital document may be used to determine the document type associated with the digital document. In some embodiments, a user input received with the digital file may indicate the document type associated with the digital documents within the digital file. The user input may be transmitted at the electronic device 104.

In some embodiments, determining the document type based at least in part on the information associated with the digital document comprises accessing the information from the database that stores a plurality of document types.

At block 606, the process 600 includes accessing a configuration file based at least in part on the document type. The configuration file 112 may be stored on the document processing computing device 110. In some embodiments, the configuration file may be stored in a database 106. The document type identified at block 606 may be used to access the correct data fields belonging to the document type by using the document type as an identifier. For example, if a single configuration file contains all the document types and their attributes/rulesets as key-value pairs, then the document processing computing device 110 may use the document type as a key to retrieve the document type's values (e.g., attributes, data fields, etc.).

In some embodiments, configuration file 112 may further comprise an indication for document processing using optical character recognition. In some embodiment, the optical character recognition may recognize data associated with the one or more fields associated with the document type. In some embodiments, the data may be stored and accessible by one or more other computing devices.

In some embodiments, the process 600 may further comprise processing the extracted field data based at least in part on the information associated with the at least one digital document; processing the extracted field data comprises executing instructions in accordance with the configuration file. In some embodiments, prior to processing the extracted field data, the process 600 may access criteria information corresponding to the configuration file and determine satisfaction of at least one criterion based at least in part on the criteria information.

At block 608, the process 600 includes determining a field in the at least one digital document. In some embodiments, the document processing computing device 110 identifies the field using pixel coordinates indicating the field's location on the digital document. The pixel coordinates may be an attribute value stored in the configuration file 112 and associated with the document type. Optical character recognition (OCR) or other suitable machine-learning techniques for identifying text within digital documents may also be utilized. For example, once optical character recognition is run on the digital document, it is searchable. A string-matching algorithm may then use the field label (e.g., "customer name") as the string and identify strings within the digital document that match the field label. The document processing computing device 110 may then extract and store the characters following the field label as the field data.

At block 610, the process 600 includes extracting field data from the at least one digital document to define extracted field data. Field data may be extracted from the digital document using any suitable text recognition technique (e.g., optical character recognition, intelligent character recognition, etc.). Once the document processing computing device 110 identifies the field within the digital document, the data belonging to the field may be stored as plaintext in a text file (CSV, TXT, HTML, RTF, DOCX, etc.). The configuration file 112 may specify the format for storing the extracted field data for the document type. The file storing the extracted field data may list the field and its corresponding extracted data as key-value pairs, where the field is the key and the extracted data is the value.

In some embodiments, a digital document may be associated with more than one document type. For example, a personal loan contract may be associated with both document types "new customer" and "loan contract". The personal loan contract may be processed according to the attributes of a new customer document type first and then processed again according to the attributes of a loan contract. The extracted data may be stored within two separate text files—one text file containing extracted data associated with the new customer document type and one text file containing extracted data associated with the loan contract document type. The fields and respective extracted data may be stored as key-value pairs in the respective text files.

At block 612, the process 600 includes storing the at least one digital document and the extracted field data. As mentioned herein, the extracted field data may be stored according to a format specified for the document type in the configuration file 112. In some embodiments, if no format is specified, the platform 100 may default to storing the extracted field data in plaintext format or other suitable default format. In addition, the platform 100 may determine an suitable storage format based on metadata associated with the digital document. For example, if the metadata for a digital document indicates the field data are stored in tables with rows and/or columns, then the extracted data may be stored in way to reflect this visual representation.

FIG. 7 illustrates an example for processing extracted field data according to further processing requirements, according to at least one example. After each field has been identified in the digital document and the field data extracted, further processing on the extracted data and/or digital document may be required. The document processing computing device 110 may identify, from the document type's attributes stored in the configuration file 112, the further processing requirements/rulesets.

At block 702, the process 700 includes receiving a digital file containing at least one digital document. Block 702 may be an example of block 120 from process 140 described herein.

At block 704, the process 700 includes determining a document type of the at least one digital document. Block 704 may be an example of block 122 from process 140 described herein.

At block 706, the process 700 includes retrieving a configuration file associated with the document type. Block 706 may be an example of block 124 from process 140 described herein.

At block 708, the process 700 includes determining at least one field in the digital document(s) based at least in part on the one or more fields identified by the configuration file and determine an indication for document processing using optical character recognition (OCR).

At block 710, the process 700 includes extracting field data from the digital document(s) corresponding to the field identified by the configuration file. Block 710 may be an example of block 126 from process 140 or an example of block 610 from process 600 as described herein.

At block 712, the process 700 includes executing optical character recognition (OCR) on the document according to an indication in the configuration file. As a person having ordinary skill in the art may appreciate, block 712 could also describe executing intelligent character recognition (ICR) or other suitable data validation. In some embodiments, the optical character recognition may be performed by the platform 100 or by the document processing computing device 110. Other embodiments may transmit the extracted data to an external module capable of performing the optical character recognition and transmitting back the processed extracted data.

Figure 8:
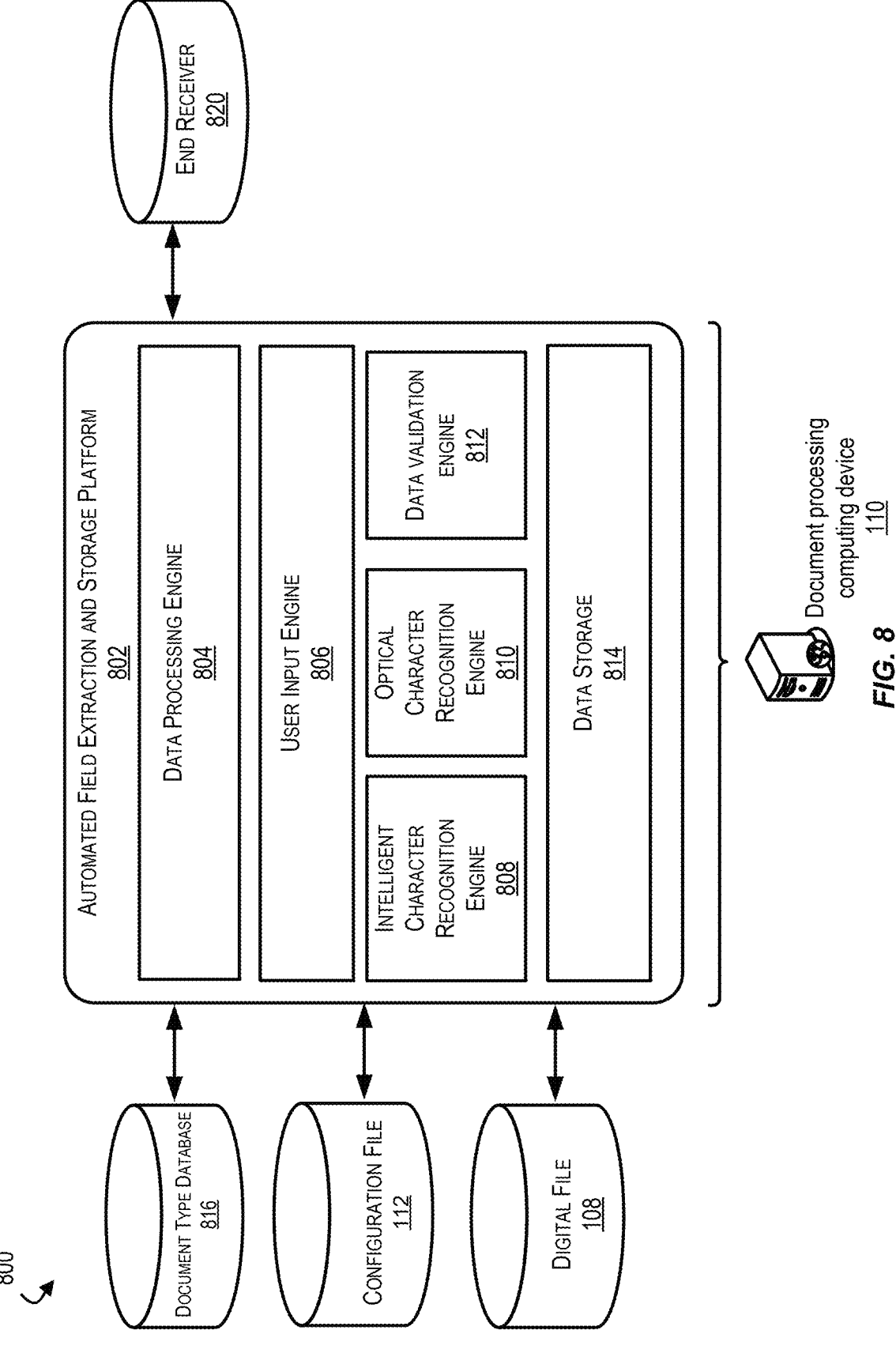
FIG. 8 is a block diagram of an example of the system that can be used to perform aspects of the examples of the present disclosure, according to at least one example.

FIG. 8 illustrates an example schematic architecture 800 for implementing techniques related to automated data capture, according to embodiments of the present disclosure. The architecture 800 may include an automated field extraction and storage platform 802. The architecture described here may be implemented using document processing computing device 110. Although not depicted, the schematic architecture 800 may incorporate any combination of a cloud network 412, database 106, and electronic device(s) 104. Other variations are within the spirit of the present disclosure and thus other objects (not depicted) may be incorporated as part of the schematic architecture 800.

The automated field extraction and storage platform 802 may comprise various components such as a data processing engine 804, user input engine 806, intelligent character recognition engine 808, optical character recognition engine 810, data validation engine 812, and data storage 814. In addition, the automated field extraction and storage platform 802 may transmit and receive data from any combination of various components such as the document type database 816, configuration file 112, digital file 108, and end receiver 820. Other variations are within the spirit of the present disclosure and thus other components (not depicted) may be incorporated as part of the schematic architecture 800.

The data processing engine 804 may be configured to perform the techniques described herein. In an example, data processing engine 804 can include any other suitable components, engines, modules, models, and the like. The data processing engine 804 is communicatively coupled (e.g., via a wired connection to a wireless connection) to the data storage 814. The data storage 814 may store the extracted field data 114. The data storage 814 can include any suitable data, databases, libraries, and the like. Furthermore, the data processing engine 804 may transmit and retrieve data from the digital file 108 and/or the configuration file 112 in furtherance of the techniques presented herein.

The user input engine 806 may be coupled with a graphical user interface 402 presented at the electronic device 104. A user 102 may then select a document type from a user input selector 404. Once selected, the user input selector 404 may present a document type menu 406 at the graphical user interface 402 to prompt the user 102 for further input. For example, the user input engine 806 executes instructions to present at the graphical user interface 402 the user input selector 404. Once the user selects the user input selector 404, the document type menu 406 will present a list of document types retrieved by the user input engine 806. The user input engine 806 may retrieve the document types for presentation in the document type menu 406 from document type database 816. The document type selected at the user input selector 404 is then received by the user input engine 806 whereupon it may be transmitted to the data processing engine 804, and/or other components, in furtherance of the techniques described herein.

The automated field extraction and storage platform 802 may also include the intelligent character recognition engine 808, optical character recognition engine 810 and/or data validation engine 812. Based upon data received from the configuration file 112, data processing engine may transmit the extracted field data 114 to one or more of the intelligent character recognition engine 808, optical character recognition engine 810, or data validation engine 812 whereupon the extracted field data is further processed according to the instructions executed by the intelligent character recognition engine 808, optical character recognition engine 810, or data validation engine 812. The intelligent character recognition engine 808 processes the extracted field data 114 for real handwritten text and/or different fonts. The optical character recognition engine 810 converts text from images into machine-readable text. The data validation engine 812 validates the extracted data against predetermined requirements/rulesets.

An end receiver 820 may transit and receive data form the automated extraction and storage platform 802. The end receiver 820 may be user 102 operated electronic device 104. In addition, the end receiver 820 may include any device, user, computer, processing device, or the like that may receive the extracted field data 114.

Figure 9:
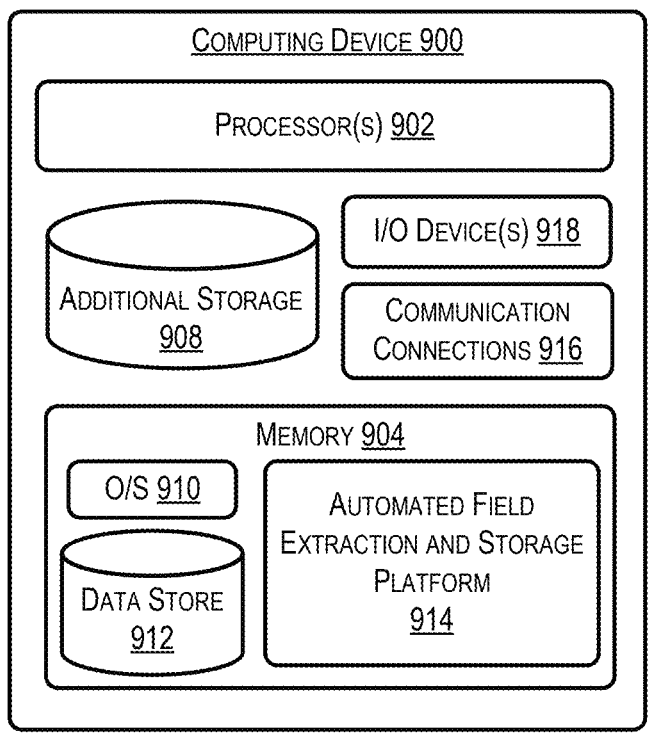
FIG. 9 is a block diagram of an example computing device that can be used to perform aspects of the examples of the present disclosure, according to at least one example.

FIG. 9 illustrates an example computing device 900 that may implement the methods disclosed herein. In some embodiments, the computing device 900 may include one or more processors (e.g., processor(s) 902). The processor(s) 902 may be implemented in hardware, computer-executable instructions, firmware, or combinations thereof. Computer-executable instruction or firmware implementations of the processor(s) 902 may include computer-executable or machine-executable instructions written in any suitable programming language.

Computing device 900 may include memory 904. The memory 904 may store computer-executable instructions that are loadable and executable by the processor(s) 902, as well as data generated during the execution of these programs. The memory 904 may be volatile (such as RAM) and/or non-volatile (such as ROM, flash memory, etc.). The computing device 900 may include additional storage 908, which may include removable storage and/or non-removable storage. The additional storage 908 may include but is not limited to, magnetic storage, optical disks, and/or tape storage. The disk drives and their associated computer-readable media may provide non-volatile storage of computer-readable instructions, data structures, program engines, and other data for the computing devices. In some implementations, the memory 904 or additional storage 908 may individually, or collectively, include multiple different types of memory, such as SRAM, DRAM, or ROM.

The memory 904 and/or additional storage 908 may be examples of computer-readable storage media. Computer-readable storage media may include volatile, non-volatile, removable, or non-removable media implemented in any method or technology for storage of information such as computer-readable instructions, data structures, program engines, or other data. In some embodiments, memory 904 and the additional storage 908 are examples of computer storage media. Memory 904 and/or additional storage 908 may include but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which can be used to store the desired information and which can be accessed by the computing device 900. Combinations of any of the above should also be included within the scope of computer-readable media. Computer-readable media may include computer-readable instructions, program engines, or other data transmitted within a data signal, such as a carrier wave, or other transmission. However, as used herein, computer-readable storage media does not include computer-readable communication media.

The memory 904 may include an operating system 910 and one or more data stores 912, and/or one or more application programs, engines, or services for implementing the features disclosed herein, such as the features provided by the automated field extraction and storage platform 914 (an example of automated field extraction and storage platform 100 of FIG. 1).

The computing device may also contain communications connection(s) 916 that allow the computing device 900 to communicate with a stored database, another computing device, a server, user terminals, and/or other devices (e.g., via one or more networks, not depicted). The computing device may also include I/O device(s) 918, such as a keyboard, a mouse, a pen, a voice input device, a touch input device, a display, speakers, a printer, etc.

In some examples, such as when a financial institution or other large entity processes large quantities of digital documents a day, the disclosed technology can be used to efficiently process the large quantities of digital documents. A digital document may be a scan or photo of a physical document or be a document electronically created through an application (WORD, DocuSign, PDF, etc.). Digital documents may have data presented as handwritten text, typed text, symbols, barcodes, QR codes, numbers, etc. The data may pertain to customer IDs, customer name, customer addresses, loan terms, loan amounts, Social Security Numbers (SSNs), customer addresses, form barcode, form IDs, bank account and/or routing numbers, etc. and the data may be either handwritten or typed. The automated field extraction and storage platform stores each document type in a repository such as a configuration file or database. The configuration file, database, or other suitable medium for storing the document type is accessible by the automated field extraction and storage platform through a network of server and client devices. Each time a new batch of files containing digital documents is received, the automated field extraction and storage platform may access the configuration file to query for the received document type and determine the data fields associated with said document type. In addition, the automated field extraction and storage platform may receive information determining if, once the data has been extracted, further processing on the data is required.

The automated field extraction and storage platform processes each digital document within the file individually and extracts the data from the aforementioned data fields. In some instances, a digital document may be associated with more than one document type and therefore the automated field extraction and storage platform may process this document as many times as the number of document types associated with this digital document. For example, if a particular digital document is both a new borrower contract and a mortgage loan, the automated field extraction and storage platform may first process the digital document to extract data fields associated with a new borrower contract and then process the digital document a second time to extract data fields associated with a mortgage loan. Alternatively, the automated field extraction and storage platform may aggregate the data fields from a new borrower contract and a mortgage loan to process the digital document for data fields associated with both document types to avoid having to process the digital document more than once.

When all the digital documents within a file have been processed, the automated field extraction and storage platform stores the extracted data and digital documents in a repository. For digital documents identified has having additional processing requirements, such as Optical Character Recognition and/or Intelligent Character Recognition, the system will transmit the digital document(s) and/or extracted field data to the suitable engine for further processing. It should be noted that further processing may be executed by third-parties, external tools, etc. and the example described here is not meant to be limiting.

The various embodiments further can be implemented in a wide variety of operating environments, which in some cases can include one or more user computers, computing devices, or processing devices that can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art of supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from electronic devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM©.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as suitable. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flashcards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, engines, services, or other elements located within at least one working memory device, including an operating system and application programs, such as a client application or Web browser. It should be appreciated that alternate embodiments may have numerous variations from that described above. For example, customized hardware might also be used, and/or particular elements might be implemented in hardware, software (including portable software, such as applets), or both. Further, connection to other computing devices such as network input/output devices may be employed.

Storage media computer readable media for containing code, or portions of code, can include any suitable media known or used in the art, including storage media and communication media, such as but not limited to volatile and non-volatile, removable and non-removable media implemented in any method or technology for storage and/or transmission of information such as computer readable instructions, data structures, program engines, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein is merely intended to serve as a shorthand method of referring individually to each separate value falling within the range unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as suitable and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

Implementations of these techniques can include corresponding methods, computer systems, apparatus, and computer programs recorded on one or more transitory or non-transitory computer storage devices (e.g., computer-readable media), each configured to perform the actions of the techniques.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer readable storage medium, for example, in the form of a computer program including a plurality of instructions executable by one or more processors.

What is claimed is:

1. A computer-implemented method, comprising:

receiving a plurality of digital files comprising at least one digital document;

determining a document type associated with the at least one digital document based at least in part on i) information associated with the at least one digital document, or ii) a user input;

accessing a configuration file based at least in part on the document type, wherein the configuration file identifies one or more fields associated with the document type;

determining a field in the at least one digital document based at least in part on the one or more fields identified by the configuration file;

determining a processing requirement associated with the document type, the processing requirement indicating at least one desired predetermined operation to be executed on the one or more fields based at least in part on the one or more fields identified by the configuration file;

determining, for each field of the one or more fields, a location associated with the field based at least in part on the one or more fields identified by the configuration file;

extracting field data, based on the location, from the at least one digital document to define extracted field data, wherein the field data corresponds to the field identified by the configuration file; and after extracting the field data from the at least one digital document:

storing the at least one digital document;

transmitting at least a first subset of the extracted field data to a processing system for processing in accordance with the processing requirement, wherein the processing system is selected based at least in part on the processing requirement and the document type;

receiving, from the processing system, the first subset of the extracted field data after processing by the processing system;

executing the at least one desired predetermined operation on a second subset of the extracted field data; and storing the first subset of the extracted field data and the second subset of the extracted field data in accordance with the at least one desired predetermined operation.

2. The computer-implemented method of claim 1, wherein the configuration file comprises an indication for document processing using optical character recognition, and wherein the computer-implemented method further comprises:

executing, by a computing device, the optical character recognition on at least the second subset of the extracted field data, wherein the optical character recognition recognizes data associated with the one or more fields associated with the document type; and storing the data to be accessible by one or more other computing devices.

3. The computer-implemented method of claim 1, further comprising:

receiving information identifying a new document type, wherein the information is based at least in part on an additional user input;

updating a list of possible document types to include the new document type; and updating, based at least in part on the new document type, the configuration file with one or more fields associated with the new document type.

4. The computer-implemented method of claim 3, further comprising:

updating a user interface to include the new document type and new field data associated with the new document type, wherein updating the user interface is performed without recompiling software code.

5. The computer-implemented method of claim 1, wherein determining the document type based at least in part on the information associated with the digital document comprises accessing the information from a database that stores a plurality of document types.

6. The computer-implemented method of claim 1, further comprising providing a user interface for presentation, wherein the user interface presents a plurality of document types in a menu, and wherein determining the document type based at least in part on the user input comprises receiving a user selection of the document type via the menu.

7. The computer-implemented method of claim 1, further comprising processing the extracted field data based at least in part on the information associated with the at least one digital document, wherein processing the extracted field data comprises executing instructions in accordance with the configuration file.

8. The computer-implemented method of claim 7, further comprising, prior to processing the extracted field data:

accessing criteria information corresponding to the configuration file; and determining satisfaction of at least one criterion based at least in part on the criteria information.

9. The computer-implemented method of claim 1, further comprising:

receiving, from an electronic device, a request to access at least one of the digital document or the extracted field data; and providing at least one of the digital document or the extracted field data for presentation at the electronic device.

10. The computer-implemented method of claim 1, wherein the plurality of digital files is associated with a class of digital files, and wherein the document type defines a sub-class within the class.

11. The computer-implemented method of claim 1, wherein the plurality of digital files is associated with a particular operational unit, and wherein the method further comprises sending a communication to the particular operational unit that includes information for accessing the at least one digital document and the extracted field data.

12. The computer-implemented method of claim 11, wherein the information comprises one or more uniform resource locators.

13. The computer-implemented method of claim 1, further comprising providing a user interface for presentation, wherein the user interface presents a plurality of field data in a panel, and wherein the field data presented is based at least in part on the document type.

14. The method of claim 1, wherein the location of the field within the at least one digital document is determined using at least one of pixel coordinates, text string matching, optical character recognition, or intelligent character recognition.

15. One or more non-transitory computer-readable media comprising computer-executable instructions that, when executed by one or more processors, cause an electronic device to perform operations, comprising:

receiving a plurality of digital files comprising at least one digital document;

determining a document type associated with the at least one digital document based at least in part on i) information associated with the at least one digital document, or ii) a user input;

accessing a configuration file based at least in part on the document type, wherein the configuration file identifies one or more fields associated with the document type;

determining a field in the at least one digital document based at least in part on the one or more fields identified by the configuration file;

determining a processing requirement associated with the document type, the processing requirement indicating at least one desired predetermined operation to be executed on the one or more fields based at least in part on the one or more fields identified by the configuration file;

determining, for each field of the one or more fields, a location associated with the field based at least in part on the one or more fields identified by the configuration file;

extracting field data from the at least one digital document to define extracted field data, wherein the field data corresponds to the field identified by the configuration file; and after extracting the field data from the at least one digital document:

storing the at least one digital document;

transmitting at least a first subset of the extracted field data to a processing system for processing in accordance with the processing requirement, wherein the processing system is selected based at least in part on the processing requirement and the document type;

receiving the first subset of the extracted field data after processing by the processing system;

executing the at least one desired predetermined operation on a second subset of the extracted field data; and storing the first subset of the extracted field data and the second subset of the extracted field data in accordance with the at least one desired predetermined operation.

16. The one or more non-transitory computer-readable media of claim 15, further comprising receiving information identifying a new document type, wherein the information is based at least in part on an additional user input;

updating a list of possible document types to include the new document type; and updating, based at least in part on the new document type, the configuration file with new field data associated with the new document type.

17. A system, comprising:

a display;

an input component;

a memory configured to store computer-executable instructions; and a processor configured to access the memory and execute the computer-executable instructions to at least:

receive a plurality of digital files comprising at least one digital document;

determine a document type associated with the at least one digital document based at least in part on i) information associated with the at least one digital document, or ii) a user input;

access a configuration file based at least in part on the document type, wherein the configuration file identifies one or more fields associated with the document type;

determine a field in the at least one digital document based at least in part on the one or more fields identified by the configuration file;

determine a processing requirement associated with the document type, the processing requirement indicating at least one desired predetermined operation to be executed on the one or more fields based at least in part on the one or more fields identified by the configuration file;

determine, for each field of the one or more fields, a location associated with the field based at least in part on the one or more fields identified by the configuration file;

extract field data from the at least one digital document to define extracted field data, wherein the field data corresponds to the field identified by the configuration file; and after extracting the field data from the at least one digital document:

store the at least one digital document;

transmit at least a first subset of the extracted field data to a processing system for processing in accordance with the processing requirement, wherein the processing system is selected based at least in part on the processing requirement and the document type;

receive the first subset of the extracted field data after processing by the processing system;

execute the at least one desired predetermined operation on a second subset of the extracted field data; and store the first subset of the extracted field data and the second subset of the extracted field data in accordance with the at least one desired predetermined operation.

18. The system of claim 17, further configured to:

receive information identifying a new document type, wherein the information is based at least in part on an additional user input;

update a list of possible document types to include the new document type; and updating, based at least in part on the new document type, the configuration file with new field data associated with the new document type.

19. The system of claim 17, further configured to:

determine the document type based at least in part on the information associated with the digital document comprises accessing the information from a database that stores a plurality of document types.

20. The one or more non-transitory computer-readable media of claim 15, further comprising determining the document type based at least in part on the information associated with the digital document comprises accessing the information from a database that stores a plurality of document types.

* * * * *